United States Patent [19]

Humbert, Jr.

[11] 4,052,307
[45] Oct. 4, 1977

[54] UNIVERSAL FILTER MOUNTING ATTACHMENT

[75] Inventor: Kingsley E. Humbert, Jr., Gastonia, N.C.

[73] Assignee: Wix Corporation, Gastonia, N.C.

[21] Appl. No.: 703,370

[22] Filed: July 8, 1976

[51] Int. Cl.$^2$ ............................................. B01D 27/10
[52] U.S. Cl. .................................. 210/130; 210/136; 210/235; 210/444; 210/DIG. 17
[58] Field of Search ............... 210/130, 136, 168, 232, 210/234, 235, 238, 440, 444, DIG. 14, DIG. 17

[56] References Cited

U.S. PATENT DOCUMENTS

| 1,797,198 | 3/1931 | Ingersoll | 210/234 |
|---|---|---|---|
| 2,894,630 | 7/1959 | Humbert, Jr. | 210/DIG. 17 |
| 2,932,400 | 4/1960 | Scavuzzo | 210/235 |
| 2,991,885 | 7/1961 | Gutkowski | 210/235 X |
| 2,995,249 | 8/1961 | Boewe et al. | 210/136 X |
| 3,000,506 | 9/1961 | Hultgren | 210/DIG. 17 |
| 3,040,894 | 6/1962 | Pall | 210/235 X |
| 3,231,089 | 1/1966 | Thornton | 210/136 X |
| 3,300,049 | 1/1967 | Hardcastle | 210/232 |
| 3,326,375 | 6/1967 | Rosaen | 210/234 X |
| 3,399,776 | 9/1968 | Knuth | 210/234 |

Primary Examiner—Wilbur L. Bascomb, Jr.
Assistant Examiner—Robert H. Spitzer
Attorney, Agent, or Firm—Shoemaker and Mattare, Ltd.

[57] ABSTRACT

A universal filter mounting attachment for engine oil filters comprises a base having valved apertures therethrough and a threaded member selected for connection to a cooperating threaded member on a particular engine. The base carries a latch which cooperates with corresponding structure on the filter to latch the filter to the base and thus to the engine for circulation through the filter of oil from the engine. The base is normally left attached to the engine and the filter is unlatched therefrom for replacement or the like. The latch and the cooperating structure on the filter are designed such that filters may be manufactured in a single configuration and attached to all engines.

13 Claims, 9 Drawing Figures

UNIVERSAL FILTER MOUNTING ATTACHMENT

BACKGROUND OF THE INVENTION

Most filters today, particularly in the automotive field, are of the spin-on type and include a cover or end closure and a threaded opening which receives a complementary threaded member or stud carried by the engine block. However, the filter mounting surface, including seal means and the threaded stud carried by the block, are not of uniform construction among the several automotive manufacturers. For example, General Motors and American Motors automobiles require one type of threaded connection, whereas Ford Motors and Chrysler Corporation require another type of threaded connection and foreign automobiles require yet a further type of threaded connection. Thus, a large number of different filters must be manufactured for use with the different mounting structures on different engines. This results not only in an increase in the amount of tooling required to manufacture the requisite number of different filters, but also necessitates larger stocks of filters of the various configurations in order to have a supply of the particular different types of filters which customers may require.

OBJECTS OF THE INVENTION

Therefore, it is an object of this invention to provide a universal filter mounting attachment for engine oil filters which includes adaptor means for attachment to the conventional filter mounting structure on the engine, and said adaptor means having latch means for cooperation with a filter to latch the filter to the adaptor means and thus to the engine.

A further object of the invention is to provide a universal filter mounting adaptor which enables a single filter configuration to be manufactured for attachment to all engines.

Yet another object of the invention is to provide a universal filter mounting attachment which includes an adaptor means and valve controlled openings constructed such that filters having a substantially identical mounting structure can be manufactured for attachment to substantially all engines, and wherein the valve means substantially reduces the amount of oil lost or spilled during filter replacement.

A still further object of the invention is to provide a filter mounting attachment which includes valve controlled means to substantially reduce the amount of oil lost or spilled during filter replacement.

An even further object of the invention is to provide a universal filter mounting attachment for engine oil filters which includes a latch structure to enable the filter to be attached to and released from an engine with only a simple push and turn manipulation required.

DETAILED DESCRIPTION OF THE PREFERRED EMBODIMENT

Figure 1:
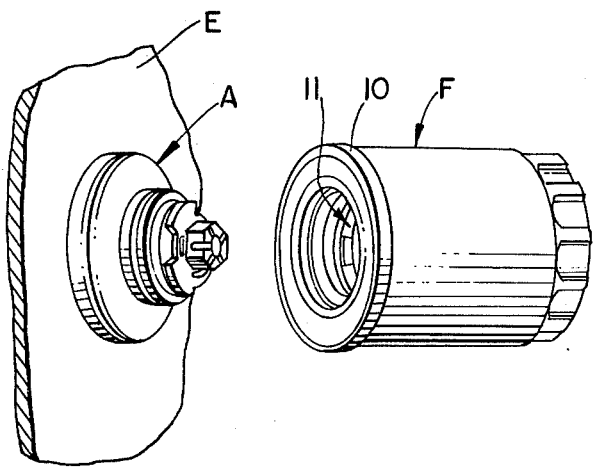
FIG. 1 is an exploded, perspective view showing the filter mounting attachment or adaptor of the invention on an engine block, and a filter having a latch in accordance with the invention about to be placed thereon.
Figure 2:
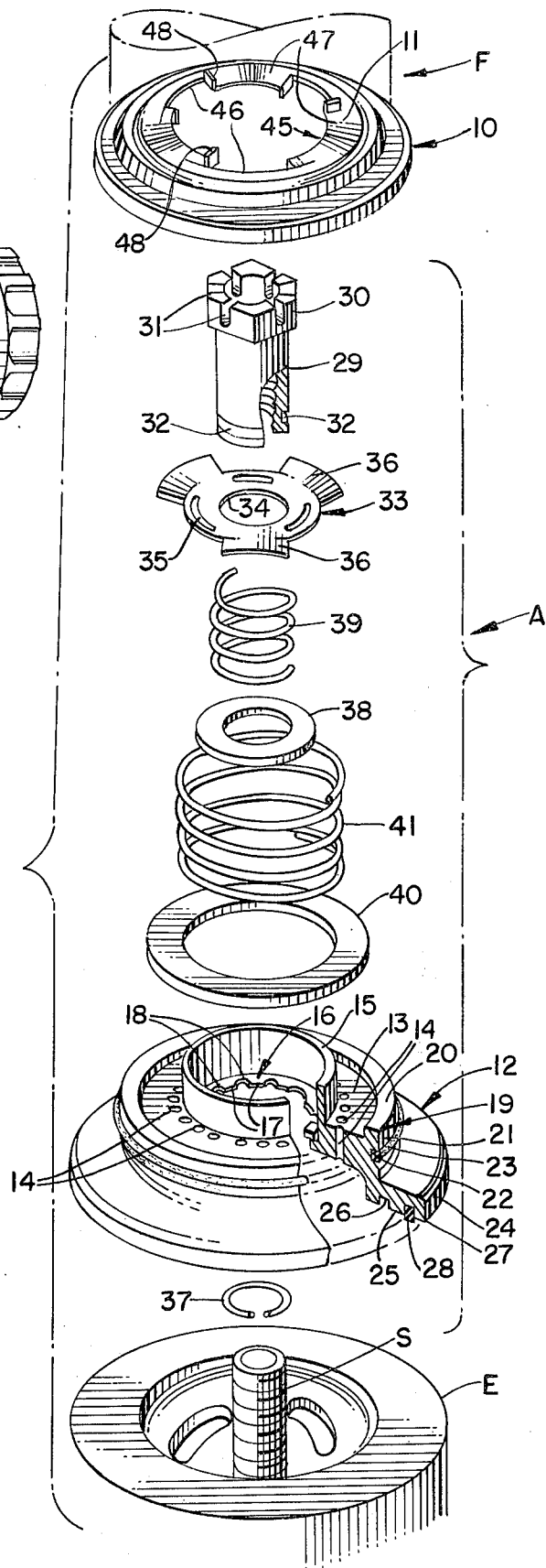
FIG. 2 is an exploded, perspective view of the filter mounting attachment of the invention including the adaptor means and the end cover of the filter.

In the drawings, wherein like reference numerals indicate like parts throughout the several views, a filter F in accordance with the invention is shown about to be attached to an attaching means or adaptor A on the engine E. The filter F includes an end cover 10 having attaching means 11 thereon for connection of the filter to the adaptor A.

The adaptor comprises a one-piece base 12 formed of any suitable material, one example of which is cast aluminum. The base comprises an annular intermediate wall 13 having a plurality of spaced perforations 14 formed therethrough. An upstanding, inner cylindrical wall 15 is formed at the inner margin of the intermediate wall 13 and a fluted, radially inwardly directed flange 16 is formed near the bottom of the upstanding wall 15, defining a plurality of circumferentially spaced apart, radially inwardly projecting lugs 17 having apertures or passages 18 therebetween. An outer cylindrical wall 19 is formed at the outer margin of the intermediate wall 13 and includes a relatively short upstanding wall 20 projecting above the plane of intermediate wall 13 and the outer cylindrical wall 19 presents an outer surface 21 having a seal ring receiving channel 22 therein with an annular seal ring 23 received in the channel. A radially outwardly projecting annular foot flange 24 is formed at the bottom end of outer cylindrical wall 19 and presents an annular, downwardly facing, flat, seal receiving surface 25 having a pair of spaced apart seal receiving channels 26 and 27 therein, and a seal 28 is carried in one of the seal receiving channels 27. In other words, for some engines a seal ring would need to be placed in the inner channel 26, whereas for other engines the seal ring would need to be placed in the outer channel 27, as illustrated at 28 in the drawings. Additional channels, or different channel configurations, can be provided as necessary to accommodate other or future engine mounting configurations.

An internally threaded bushing or coupling member 29 has a castellated hexhead 30 thereon, the castellated hexhead defining a plurality of flow passages 31. An annular snap ring receiving groove or channel 32 is formed in the outer surface of the bushing 29 on the end thereof opposite the castellated hexhead 30.

A latch member 33 has a central opening 34 therethrough, through which the bushing 29 is received, with the latch 33 engaged against the underside of the castellated hexhead 30. A plurality of flow apertures or slots 35 are also formed through the latch between the inner and outer marginal edges thereof, and a plurality of radially outwardly projecting, slightly concavo-convex latch elements or lugs 36 are formed on the latch.

Figure 3:
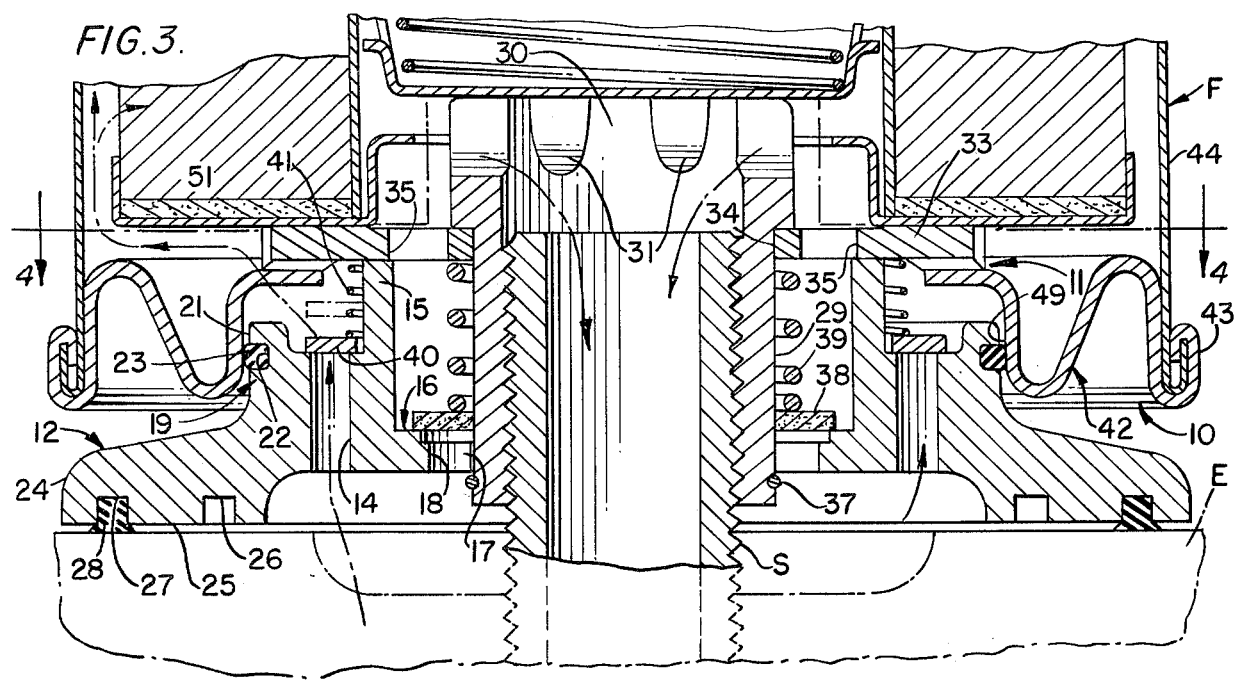
FIG. 3 is a greatly enlarged, fragmentary view in section of a filter latched to an adaptor means, including the universal filter mounting attachment according to the invention.
Figure 4:
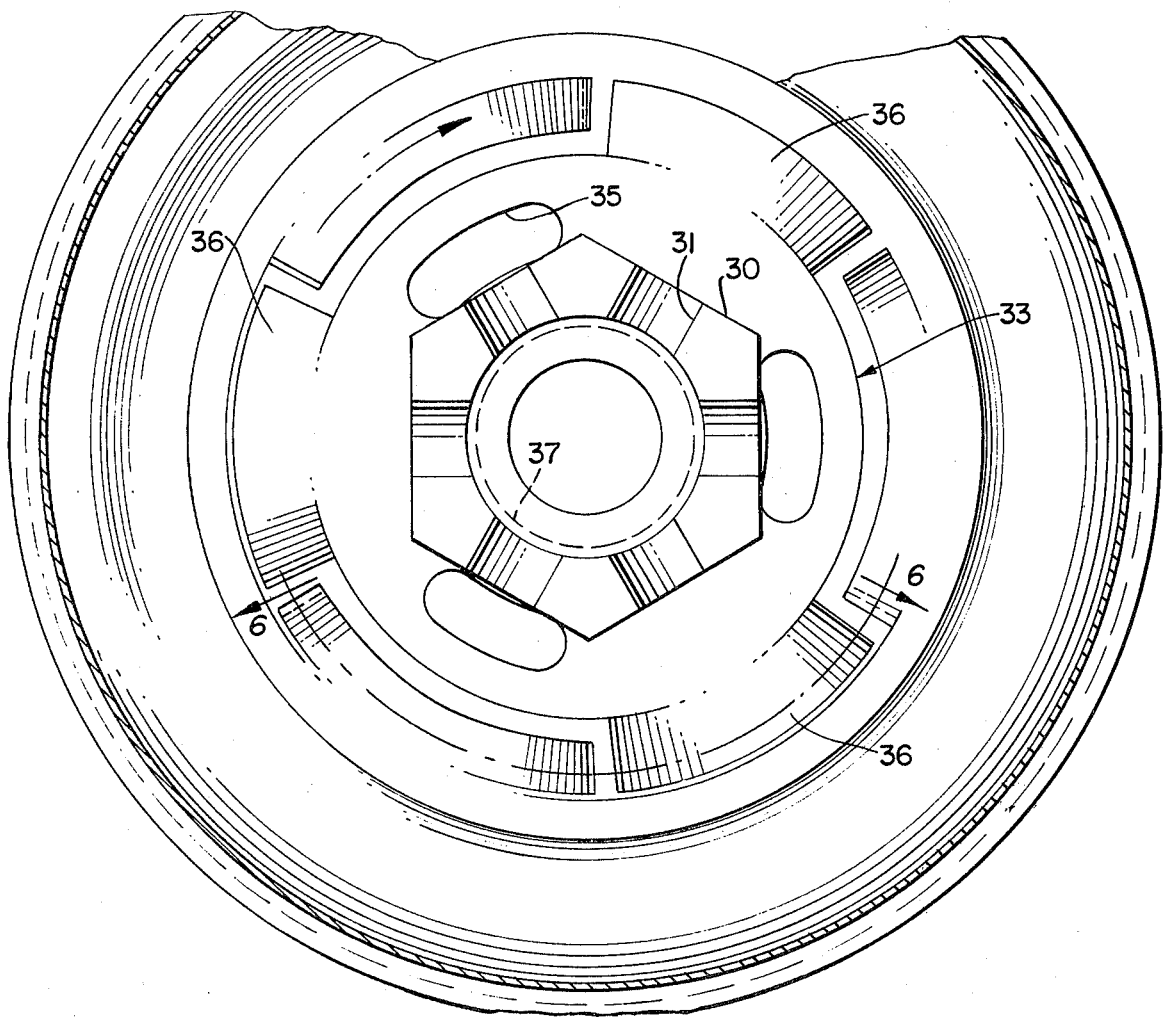
FIG. 4 is a view taken along line 4—4 in FIG. 3.

The length of the bushing 29 from immediately beneath the castellated hexhead 30 to the other end thereof is slightly greater than the combined thickness of the latch 33 and the base from the top of inner cylindrical wall 15 to the underside of scalloped flange 16, and in use, the bushing is extended through the opening 34 in latch 33 and through the opening defined by the inner ends of lugs 17 on flange 16 and a snap ring 37 is engaged in the channel 32 of the bushing 29 to retain the parts in assembled relationship, as seen in FIG. 3, for example. Additionally, an annular, washer spaced valving member 38 is reciprocably disposed in the annular space defined between bushing 29 and inner cylindrical wall 15 in overlying relationship to openings 18, and a coil spring 39 is engaged between the underside of the latch and the valving member 38 to maintain the valving member seated on the flange 16 in closing relationship to the openings 18.

The valving member 38 comprises a bypass valve member which is normally closed, but in the event the filter becomes clogged or is otherwise unable to pass the full requirement of oil to the moving parts of the engine and the oil pressure from the engine thereby increases, the bias of the spring 39 is overcome and the valve 38 opens to enable oil to flow directly from the engine into the threaded stud S for return to the engine.

Additionally, a similar but larger annular, washer shaped valve 40 is reciprocably positioned over the intermediate wall 13 in covering relationship to the openings or apertures 14, and a coil spring 41 is engaged between the valve 40 and the underside of latch 33. In normal use, the valve 40 is moved to an open position spaced upwardly from the openings 14 under the pressure of oil pumped from the engine, whereby the oil flows in a direction indicated by the arrows in FIG. 3. When the engine ceases running and thus no longer provides oil under pressure to the openings 18, valve member 40 is biased closed by the spring 39, preventing back flow of oil from the filter to the engine.

The adaptor A, including the base 12, valves 38 and 40, latch 33 and bushing 29 with castellated head 30, are assembled together as a unit, and depending upon the particular engine the adaptor is to be used with, an appropriate seal ring 28 is provided or placed in the appropriate seal ring receiving channel 26 or 27, and the adaptor is then threadably engaged with the stud S on the respective engine, whereby the adaptor is attached to the engine. Thereafter, a filter F is purchased and merely latched to the adaptor A by engagement of the attachment means or latch means 11 on the cover 10 of the filter F with the latch 33 of the adaptor. In this connection, it would not be necessary to manufacture and stock a large number of filters having different attaching means thereon for attachment to different makes of engines, inasmuch as the adaptor would be manufactured for the respective engines, and the latch would be constructed to cooperate with any filter having a cooperating latch means 11 thereon for securement of the filter to the engine.

Figure 7:
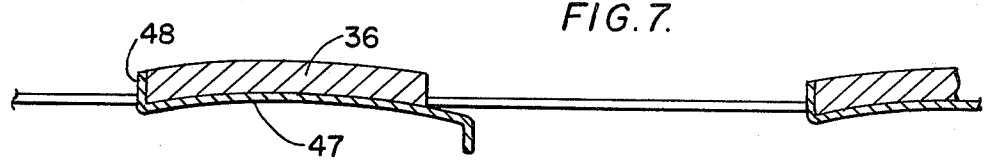
FIG. 7 is a view similar to FIG. 6, showing the parts in latched engagement.
Figure 8:
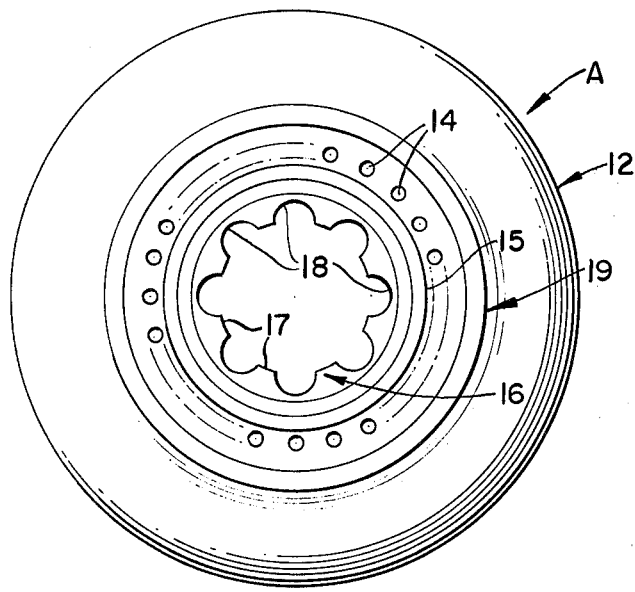
FIG. 8 is a top or plan view of the adaptor means with the castellated bushing or bolt removed.
Figure 9:
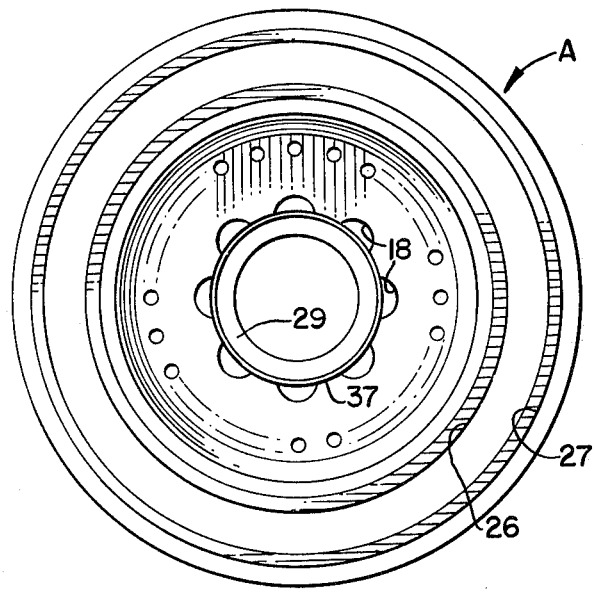
FIG. 9 is a bottom plan view of the adaptor means of the invention.

The end cover 10 on the filter F comprises a circumferentially corrugated wall 42 having an outer peripheral edge 43 permanently secured to the end of side wall 44 of filter F by means of a double roll seam or other suitable connection. The inner marginal edge 45 has a plurality of cutout portions 46 therein corresponding in number and size and shape to the latching ears or wings 36 on latch 33, whereby the latching ears or wings may be received through the cutout portions 46. Radially inwardly projecting dogs or latching elements 47 are formed between the cutout portions 46 and these latching elements 47 have a generally arcuate cross-sectional configuration substantially corresponding to that of the latch ears or wings 36. Upstanding stop tabs 48 are formed on one end of each of the latch elements 47 for engagement with an adjacent side or end edge of the latch ears or wings 36 when the filter is properly rotated relative to the adaptor to place the latch 33 and attachment means 11 of the cover 10 in latched engagement with one another, as seen, for example, in FIGS. 3 and 7.

Between the inner margin 45 and the outer seam 43 the circumferentially corrugated wall 42 of end cover 10 defines a substantially cylindrical seal surface 49 for sliding sealing engagement with the seal ring 23 carried in the channel 22 of base 12 of the adaptor A.

The filter F includes a filter element 50 supported within the side wall 44 and having an annular bottom end wall 51 with an upstanding outer annular wall or flange 52 thereon engaged against and supporting the bottom end of filter element 50, and having an upstanding inner cylindrical wall or flange 53 with an annular, radially inwardly directed seat flange 54 thereon. A cylindrical, perforated inner wall 55 extends from the bottom annular wall 51 upwardly inside the filter element 50 to near the top thereof. A generally cup-shaped valve or closure member 56 is normally seated at its outer marginal edge on the annular flange or seat wall 54 within the filter, and has an upstanding cylindrical wall 57 at its outer marginal edge, with a plurality of radially outwardly deformed guide tabs or ribs 58 thereon. A coil spring 59 is engaged between the valve or closure member 56 and suitable spring retaining means 60, such as a plurality of inwardly deformed projections. Alternatively, the spring retaining means may comprise a single annular rib formed in the inner wall 55.

Figure 5:
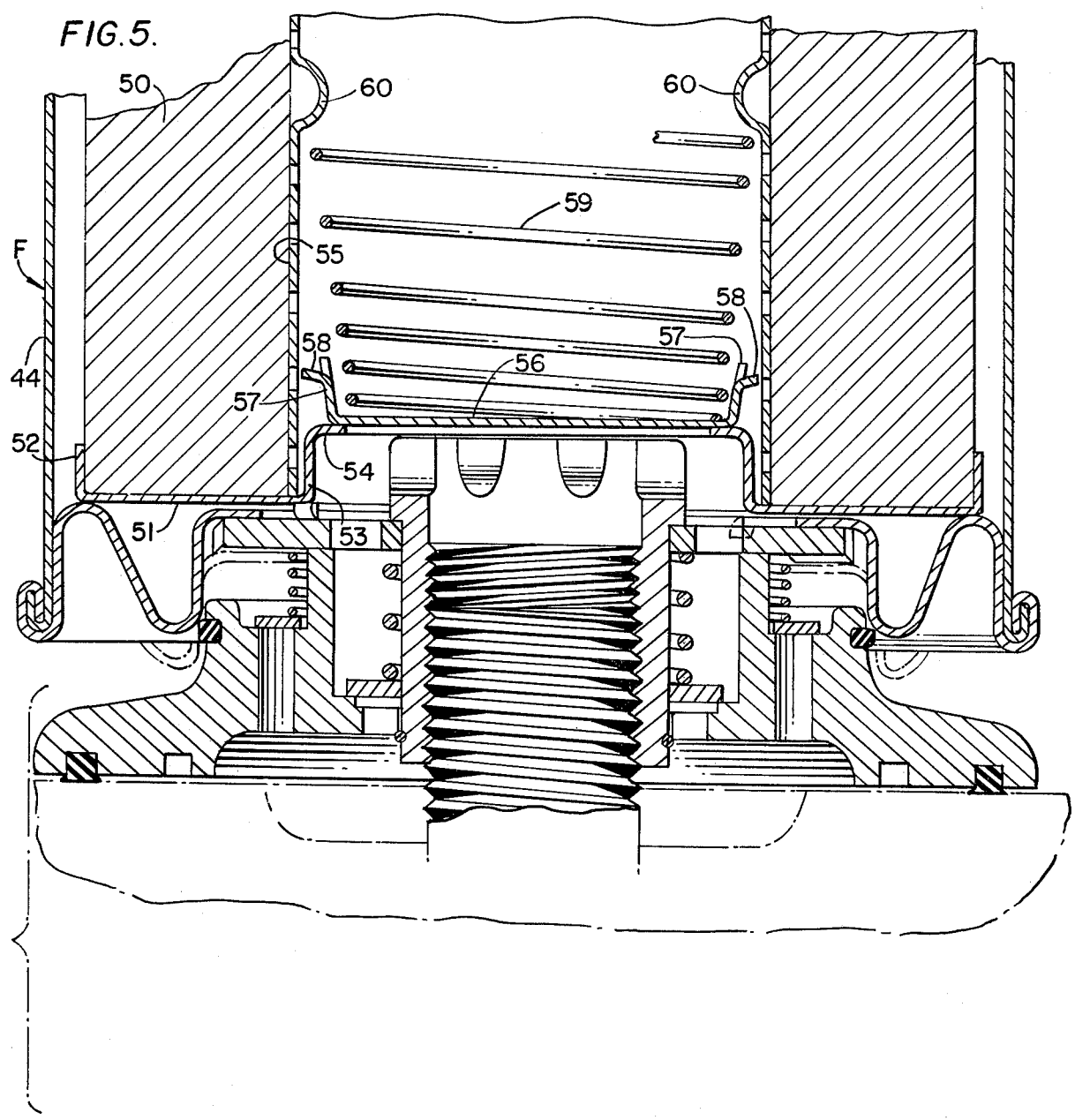
FIG. 5 is a view similar to FIG. 3, showing the filter just engaged with the adaptor means and prior to the latch being operated to latch the filter to the adaptor means.
Figure 6:
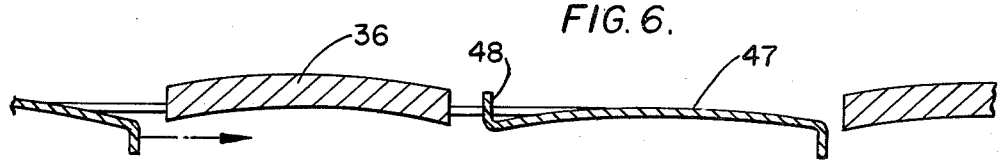
FIG. 6 is a somewhat schematic, sectional, fragmentary view of a portion of the latch means of the filter mounting attachment of the invention, showing the latch and filter end cover in position ready to be rotated for latching engagement.

Thus, at the time the filter F is purchased and prior to the time it is placed on the adaptor A, the closure member 56 is seated on the seat 54 and the filter elements assume the general position as shown in FIG. 5. Thereafter, when the filter is positioned for latching engagement with the adaptor A and just prior to the filter being latched thereto, as seen, for example, in FIG. 5, the castellated head 30 of bushing 29 is engaged against the underside of valve or closure 56 and the lowermost edge of surface 49 is engaged with seal 23 carried by the base 12 of adaptor A. In this position, the latch wings or ears 36 are aligned with the cutout portions 46 in the end cover 10. The filter F is then pushed down onto the adaptor until the latching elements 47 of end cover 10 are positioned slightly beyond the plane of latch ears or wings 36, and the filter is then rotated through approximately 60° to bring the latch elements 47 behind the ears 36 until the stops 48 engage the ends or edges of ears 36, and the filter is latched to the adaptor in this position. Moreover, upon pushing the filter axially onto the adaptor, the surface 49 effects a sliding seal with the seal element 23, and simultaneously the valve or closure 56 is moved from its seat 54 by engagement with the castellated head 31 of bushing 29. (See FIG. 3). In this arrangement of the parts, the interior of the filter is exposed through the adaptor to the engine oil passages, and upon starting of the engine, the oil pump will force oil upwardly through the ports 14, causing the valve 40 to open, and thence outwardly through the cutout portions 46 in cover 10 into the filter, whereupon the oil flows through the filter element 50 and is cleansed and returned through the cutouts 31 in castellated head 30 of bushing 29 and thence downwardly through the interior of the stud S back to the engine. In the event the filter element 50 should become clogged, the oil pressure will build up a pressure in the oil until the bypass valve 38 is caused to open, and the oil will then flow in bypassing relationship directly through the castelltions or cutouts 31 and back through the stud S to the engine.

To remove the filter from the adaptor, the above steps are merely repeated in reverse. It will be seen that very little oil is lost or spilled from the filter during its removal from the adaptor, since the closure 56 seats upon its seat 54 prior to disengagement of the surface 49 from seal 23. Also, as seen in FIG. 5, the end wall 51 of the filter element 50 is forced against the cover 10 preventing passage of oil therebetween. Thus, the filter is substantially closed or sealed to prevent loss of the oil therefrom prior to its release from the adaptor A. Similarly, the valve elements 38 and 40 in the adaptor itself are closed under the influence of springs 39 and 41, so that very little oil is lost from the engine itself.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A universal filter mounting adaptor for internal combustion engines, comprises: a base plate having first seal means thereon for sealing engagement with an engine on which the adaptor is to be mounted and having first aperture means therethrough for flow of fluid from an engine and through the adaptor; a coupling member carried by the base plate for coupling engagement with complementary means on an internal combustion engine to secure the adaptor to the engine, said coupling member being selected for attachment to the particular engine on which it is used; a latch member carried by the base plate in a position for complementary latching engagement with latch means on a filter to be attached to the adaptor, said latch member being cooperable with all filters manufactured for use with the adaptor; second seal means on the base plate for sealing cooperation with a filter attached to the adaptor; normally closed valve means carried by the base plate to prevent loss of fluid from the engine through the first aperture means, said valve means being openable by fluid pressure developed in an engine to which the adaptor is attached; and said coupling member extending through the base plate and having means thereon for holding the base plate, latch and valve means assembled together for attachment as a unit to an engine.

2. A filter mounting adaptor as in claim 1, wherein said base plate has second apertures therethrough, second valve means in the base plate normally biased into closed relationship relative to the second apertures, said second valve means being moved to open position in response to oil pressure when the filter is clogged, so that the oil flows through the adaptor and back into the engine in bypassing relation to the filter.

3. A filter mounting adaptor as in claim 2, wherein said base plate has opposite end surfaces, and said first seal means is on one end surface of the base plate and the latch is carried at the other end of the base plate, both said normally closed valve means and said second valve means being carried by the base plate between the ends thereof, and said second seal means carried by the base plate between the ends of the base plate for sliding sealing engagement with a filter attached to the base plate.

4. A filter mounting adaptor as in claim 1, wherein the coupling member is tubular and extends coaxially through the base plate and latch.

5. A filter mounting adaptor as in claim 4, wherein the coupling member is internally threaded at one end thereof for complemental threaded engagement with an externally threaded stud on an engine, and said coupling member has a castellated head at its other end for engagement with a valve in a filter latched to the base plate to open the valve, said coupling member comprising a return flow path for oil from a filter back to an engine in which the adaptor is used.

6. In combination, an oil filter adaptor means having coupling means thereon for cooperation with conventional filter attaching structure on an engine to attach the adaptor means to the engine, latch means on the adaptor means for latching engagement with complementary latch means on a filter manufactured for use therewith, and a filter having complementary latch means thereon engaged with the latch means on the adaptor means, releasably latching the filter to the adaptor means and thereby releasably latching the filter to the engine, said adaptor means having first apertures therethrough for flow of oil from the engine through the adaptor means to the filter for filtration of the oil, first valve closure means biased toward closing relationship with the first apertures, said first valve closure means being moved toward open position by oil pressure developed in the engine, valve means in the filter, biasing means in the filter biasing the valve means toward closed position when the filter is removed from the adaptor means to prevent spillage of oil from the filter, and valve actuating means on the adaptor means engageable with the valve means in the filter to open the valve means when the filter is latched to the adaptor means to enable flow of oil through the filter.

7. The combination as in claim 6, wherein the adaptor means includes a base plate having opposite ends, said latch means being carried by the base plate on one of its ends and said coupling means extending through the base plate and having means thereon for holding the base plate, latch and valve means assembled together as a unit, said valve actuating means comprising an end of the coupling means.

8. The combination as in claim 7, wherein said base plate has second apertures therethrough and second valve closure means carried by the base plate normally biased into closed relationship relative to the second apertures, said second valve means being moved to open position in response to oil pressure when the filter is clogged so that the oil flows through the adaptor means and back into the engine in bypassing relation to the filter.

9. The combination as in claim 7, wherein the valve actuating means comprises a castellated head on the coupling means, said coupling means comprising a tubular member extending through the adaptor means for flow of oil from the filter back to an engine on which the adaptor means is attached.

10. The combination as in claim 6, wherein the adaptor means includes a base plate, said base plate having opposite ends thereon, one of said ends presenting an axially facing end surface, first seal means carried by the end surface for sealing engagement with an engine and the other end of the base plate having a cylindrical surface, second seal means on the cylindrical surface for sliding sealing engagement with a correspondingly shaped cylindrical surface on the filter.

11. The combination as in claim 6, wherein the filter has an end wall, said end wall having inlet flow passage means therethrough for receiving flow of oil to be filtered from an engine on which the filter is mounted, and return flow passage means therethrough for return of filtered oil to the engine, said first flow passage means being controlled by the first valve closure means and said return flow passage means being controlled by the valve means in the filter.

12. The combination as in claim 11, wherein the latch means includes cooperating quick-release latch elements on the filter end wall and latch elements on the adaptor means, said latch means including circumferentially spaced latching elements operable to latch the filter to the adaptor means upon partial rotation of the filter about the axis of the latching means.

13. The combination as in claim 12, wherein the latch means includes a plurality of slots through the filter end wall for reception therethrough of corresponding latch elements on the adaptor means, said latch elements having a configuration to frictionally engage and retain other latch elements with less than one revolution of the filter latch means required to effect unlatching and latching engagement.

* * * * *